UNITED STATES PATENT OFFICE.

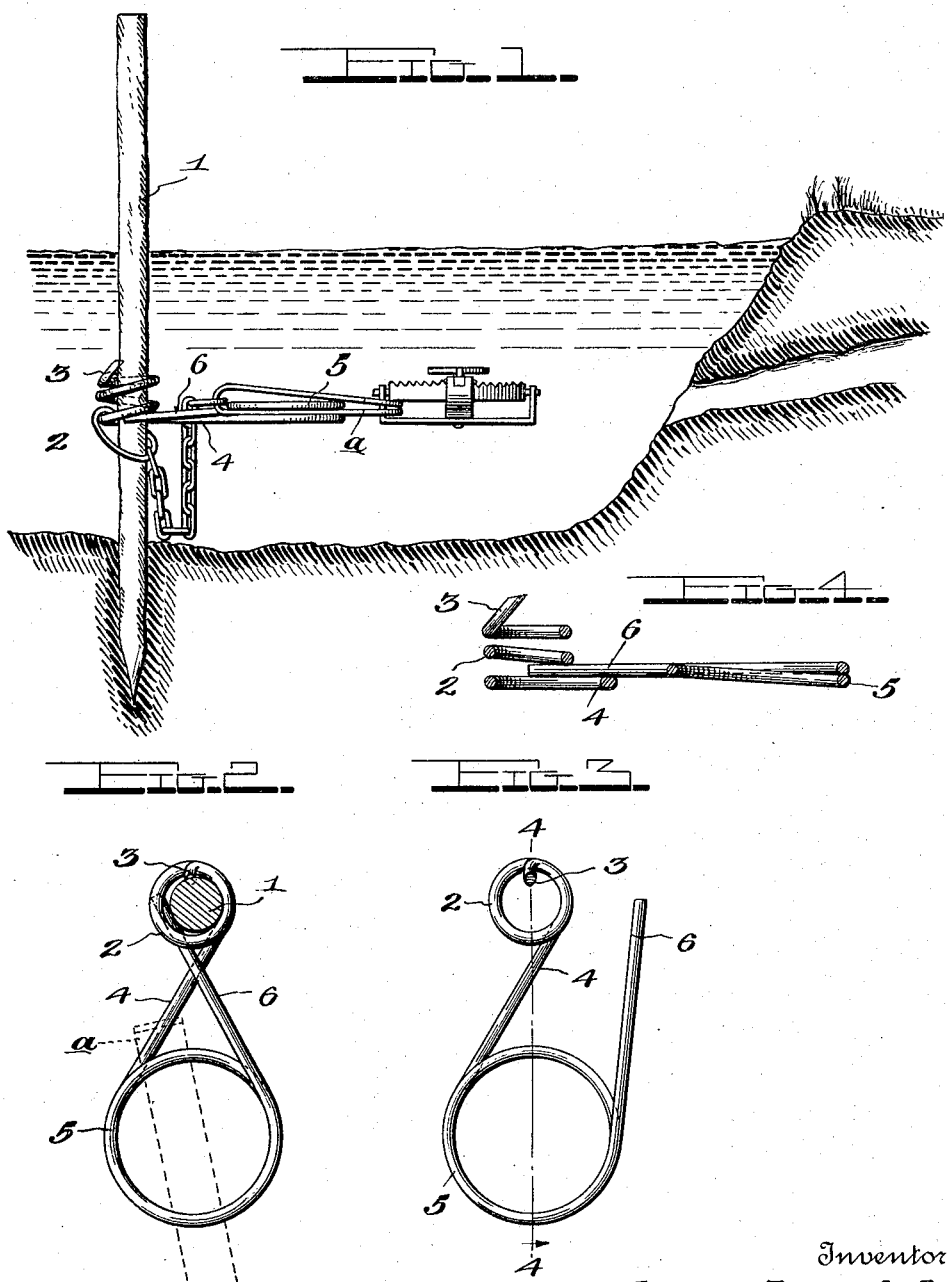

LARS ANGVICK, OF McFARLAND, WISCONSIN.

TRAP-HOLDER.

1,201,427.  Specification of Letters Patent. Patented Oct. 17, 1916.

Application filed April 24, 1916. Serial No. 93,263.

*To all whom it may concern:*

Be it known that I, LARS ANGVICK, a citizen of the United States, residing at McFarland, in the county of Dane and State of Wisconsin, have invented certain new and useful Improvements in Trap-Holders; and I do declare the following to be a full, clear, and exact description of the invention, such as will enable others skilled in the art to which it appertains to make and use the same.

This invention relates generally to traps, but more particularly to trap holders.

One object of the invention is to provide a device for holding and supporting traps beneath the surface of the water in position for catching muskrats and the like, whereby the animal is prevented from escaping to the bank and is held under the water so that drowning is assured.

Another object of the invention is to provide a means whereby traps of this character may be placed under the surface of the water easily without the necessity of the person setting the trap putting his hands or arms into the water.

A further object of the invention is to provide a trap holder which may be supported at any distance beneath the surface of the water as it is desired.

An additional object of the invention is to provide a device of this character which is simple, strong, durable and inexpensive in construction, efficient and reliable in operation, and well adapted to the purpose for which it is designed.

In the accompanying drawings, forming a part of the specification, and in which similar reference characters designate like parts throughout the several views: Figure 1 is a vertical sectional view through the bed of a stream, illustrating the application of a device constructed in accordance with this invention; Fig. 2 is a top plan view of the trap holding device; the upright post to which it is shown attached in section; Fig. 3 is a similar view of the trap holding device detached from the post; and, Fig. 4 is a sectional view taken on the plane of the line 4—4 of Fig. 3.

Referring more particularly to the drawing, the reference numeral 1 designates an upright post which is greater in length than the depth of the stream or other body of water in which the trap to be hereinafter described is to be set, and is pointed at its lower end to facilitate its insertion into the bed of the stream. This rod 1 may be of any suitable configuration in cross section, but as here shown, it is preferably cylindrical.

The trap holding device slidably mounted on the post 1 and clamped thereon at any desired distance beneath the surface of the water may be made in a variety of ways within the scope of this invention, but it is preferably formed from a single strip of heavy wire or other similar material, and comprises a cylindrical sleeve member or coil 2, the upper free end of which is bent longitudinally of the same and slightly inwardly and pronged to form a spur 3. The other end of the coil 2 is projected outwardly from the same to form a transverse arm 4, the latter having a substantially flat cylindrical coil 5 formed at its free end. This coil 5 comprises in effect a supporting member as will be hereinafter fully described. Projecting from the free end of the coil 5 is a clamping member or arm 6 which extends and is movable transversely across the eye or opening through the aforesaid cylindrical coil or sleeve member 2. As shown, this arm 6 engages and clamps the post 1 between it and one side of said coil 2.

In using the device, the depth of the stream or other body of water is sounded, and the arm 6 is moved entirely across the opening of the sleeve member 2 to allow the post 1 to be inserted through said opening. Upon releasing the arm 6, which, owing to the fact that it is formed integrally with the coil 5, it tightly engages the side of the post 1 and effects the aforesaid clamping action upon the same. The spur 3 projects into the side of the post 1 and prevents the device from being moved around the same as well as maintains the supporting member or coil 5 in substantially horizontal position, as will be readily understood.

The device is designed particularly for use in connection with the ordinary animal trap shown in the drawings having a substantially flat horizontal portion *a* extending therefrom. This portion *a* is disposed and firmly clamped between the adjacent loops of the coil as shown. The usual flexible anchoring element or chain is looped to a portion of the coil 2 to prevent loss of the trap, should it for any reason become disengaged from its supporting member. After the trap has been thus clamped in position and set, the post is inserted into the bed of the stream close to a runway in the bank, which obviates the necessity of using bait. The upper end of the post projects above the surface of the water so that there is no necessity of the person setting the trap putting his hands or arms in the water. The purpose of this will be obvious especially when the traps are to be set during cold weather.

From the foregoing description, taken in connection with the accompanying drawings, it may be seen that the objects of the invention have been effectively carried out.

As various changes in form, proportion and in the minor details of construction, may be resorted to without departing from the spirit of this invention, I do not wish to be limited to the construction herein shown and described, other than that set forth in the appended claims.

I claim as my invention:

1. A device of the class described comprising a sleeve member having a spur extending inwardly therefrom, a supporting member carried by said sleeve member, and a clamping arm carried by one of said members and movable transversely across the opening through said sleeve member.

2. A device of the class described comprising a sleeve member having a spur extending inwardly therefrom, a substantially flat coil carried by said sleeve member, and a clamping arm projecting from the free end of said coil and movable transversely across the opening through said sleeve member.

3. A device of the class described formed from a single piece of material comprising a cylindrical coil having one of its ends bent longitudinally of and slightly inwardly to form a spur, the other end of said coil projecting outwardly from the same to form a transverse arm, a substantially flat coil formed at the free end of said arm, and a clamping arm projecting from the free end of said flat coil and movable transversely across the opening through said cylindrical coil.

4. In a device of the class described, the combination with an upright post, of a sleeve member slidable on said post, a spur extending longitudinally of and slightly inwardly from the upper end of said sleeve member and projecting into said post, a supporting member extending transversely from the lower end of said sleeve member and provided with clamping means thereon, and an arm carried by one of said members and extending transversely across the opening through said sleeve member, said arm engaging and clamping said post between the same and one side of said sleeve member.

In testimony whereof I have hereunto set my hand in presence of two subscribing witnesses.

LARS ANGVICK.

Witnesses:
M. D. LARSON,
M. J. VINJE.

Copies of this patent may be obtained for five cents each, by addressing the "Commissioner of Patents, Washington, D. C."